United States Patent
Lung et al.

(10) Patent No.: US 6,545,266 B2
(45) Date of Patent: Apr. 8, 2003

(54) FOUR-DIRECTION ADJUSTABLE OPTICAL MODULE

(75) Inventors: Chen Lung, Shindian (TW); Lee Ta Yi, Shindian (TW)

(73) Assignee: Silitek Corporation, Taipei (TW)

( * ) Notice: Subject to any disclaimer, the term of this patent is extended or adjusted under 35 U.S.C. 154(b) by 329 days.

(21) Appl. No.: 09/732,775

(22) Filed: Dec. 11, 2000

(65) Prior Publication Data

US 2002/0069549 A1 Jun. 13, 2002

(51) Int. Cl.[7] .................................................. H01J 5/02

(52) U.S. Cl. ....................... 250/239; 250/234

(58) Field of Search ................................. 250/239, 234, 250/235, 208.1, 559.1, 551, 216; 358/482–484; 257/80–82, 431–435

(56) References Cited

U.S. PATENT DOCUMENTS 6,473,205 B1 * 10/2002 Pepe ........................... 358/483

* cited by examiner

Primary Examiner—Que T. Le
(74) Attorney, Agent, or Firm—Rabin & Berdo, P.C.

(57) ABSTRACT

A four-direction adjustable optical module including a carriage and a CCD module is disclosed. The carriage includes a coupling window for coupling with the CCD module. Each of the two sides of the CCD module includes a screw hole and an elastic device. The elastic device slightly protrudes from the surface of the coupling window. While the CCD module and the coupling window are coupled, screws are employed to screw through the CCD module and into the screw holes of the coupling windows. Therefore, the elastic devices deform by the stress from the CCD module. By adjusting the tightness of the screws, the orientation of the CCD module rotating on the Z axis can be calibrated. Thus, the adjustable optical module of the invention can be calibrated at least in four directions.

9 Claims, 8 Drawing Sheets

FOUR-DIRECTION ADJUSTABLE OPTICAL MODULE

BACKGROUND OF THE INVENTION

This application incorporates by reference Taiwanese application Serial No. 089217702, Filed on Oct. 12, 2000.

1. Field of the Invention

The invention relates in general to a photo-sensing apparatus, and more particularly to an optical module, which can be calibrated at least in four directions.

2. Description of the Related Art

The advance of hi-technology recently is leading the revolution of electric equipment and appliance such as computers, computer peripherals, and multi-functional peripherals. For example, scanners are developed to have resolution up to 1200 dpi and 9600 dpi. Besides higher quality, cost down is also an important issue for the scanner manufactures to be competitive.

Most commercial scanners apply charge couple device (CCD) as a photo sensor to sense the light reflected from the to-be-scanned document. In order to obtain a better image, the path of the reflected light should be perpendicular to the surface of the optical module. Thus, the position of the CCD module should be adjustable precisely to increase the scanning quality.

FIG. 1A shows the ideal relative position of the CCD module and the path of the light. The ideal position of the CCD module and the path of the light are perpendicular to each other. Herein, the CCD module 100 is located parallel to YZ plane and the light is moving along the X axis.

The CCD module 100 is typically assembled with a carriage. The CCD module 100 and the carriage together form an optical module. The misalignment of the CCD module 100 during the assembling process is hard to avoid. Thus, adjusting the CCD module is an important step after assembly. The orientation of the CCD module 100 is generally designed to be able to move along the Z axis (as shown in FIG. 1B), to move along the Y axis (as shown in FIG. 1C), to rotate on the X axis (as shown in FIG. 1D), to rotate on the Z axis (as shown in FIG. 1E), and to move along the X axis (as shown in FIG. 1F).

Three-direction and five-direction adjustable optical modules are two conventional designs. The CCD module of the conventional three-direction adjustable optical module can be manually adjusted to have the movements like moving along the Z and Y axes and rotates on the X axis. The optical module of the conventional three-direction adjustable optical module can be further adjusted by focusing the lens along the X axis.

The CCD module of the five-direction adjustable optical module, with the aid of extra devices, has the movements like moving along the X, Y, and Z axes and rotating on the X and Z axes.

The conventional three-direction adjustable optical module 200 is illustrated in FIG. 2, which includes a carriage 210 with a coupling window 210a, and a CCD module 220. The coupling window 210a has a screw hole 240. The CCD module 220 and the carriage 210 can be connected by using screws 230 to penetrate the CCD module 220 and fix in the screw hole 240 of the coupling window 210a.

The conventional three-direction adjustable optical module 200 has the advantage of low cost since three-direction adjustment can be easily obtained by simple design. For the purpose of further cost down, the carriage 210 is typically made of plastics. However, the process of plastic formation tends to cause flaw on the carriage 210. If the coupling window 210a is made not parallel to the YZ plane, the CCD module 220 fixed thereon can not be parallel to the YZ plane, neither. Since the conventional three-direction adjustable optical module 200 is not able to rotate on the XZ axis, the CCD module 220 can not be calibrated. It is therefore apparent that the image quality will be greatly effected.

A five-direction adjustable optical module, as shown in FIG. 3, was then proposed. The conventional five-direction adjustable optical module is able to move along the X, Y, and Z axes and rotate on the X and Z axes. As shown in FIG. 3, the conventional five-direction adjustable optical module 300 includes a carriage 310, CCD module 320, device 330, device 340 and device 350. The CCD module 320 is indirectly connected to the contact window 310a of the carriage 310 and there are the device 330, device 340, and device 350 sequentially between the carriage 310 and the CCD module 320. The CCD module 320 is calibrated by the combination of the device 330, device 340, and device 350 under the control of a calibration program rather than manual control. However, it is apparent that the five-direction adjustable optical module 300 needs more devices and is more complicated so that the cost thereof is rather high and is therefore less competitive in the market.

To sum up, the conventional optical module has the following disadvantages:

1. the CCD module of the conventional three-direction adjustable optical module can not rotate on the Z axis; thus, the calibration result can not be optimized; and
2. the conventional five-direction adjustable optical module is less competitive in the market, regarding the cost and price.

SUMMARY OF THE INVENTION

It is therefore an object of the invention to provide a four-direction adjustable optical module, which is based on a three-direction adjustable optical module and is further modified to rotate on the Z-axis. Hence, the four-direction adjustable optical module of the invention is simple in structure but can be calibrated in at least four directions.

According to the object of the invention, a four-direction adjustable optical module including a carriage and a CCD module is disclosed. The carriage includes a coupling window for coupling with the CCD module. Each of the two sides of the CCD module includes a screw hole and an elastic device. The elastic device slightly protrudes from the surface of the coupling window. While the CCD module and the coupling window are coupled, screws are employed to screw through the CCD module and into the screw holes of the coupling windows. Therefore, the elastic devices deform by the stress from the CCD module. By adjusting the tightness of the screws, the orientation of the CCD module rotating on the Z axis can be calibrated. Thus, the adjustable optical module of the invention can be calibrated at least in four directions.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

EXAMPLE 1

Figure 1A:
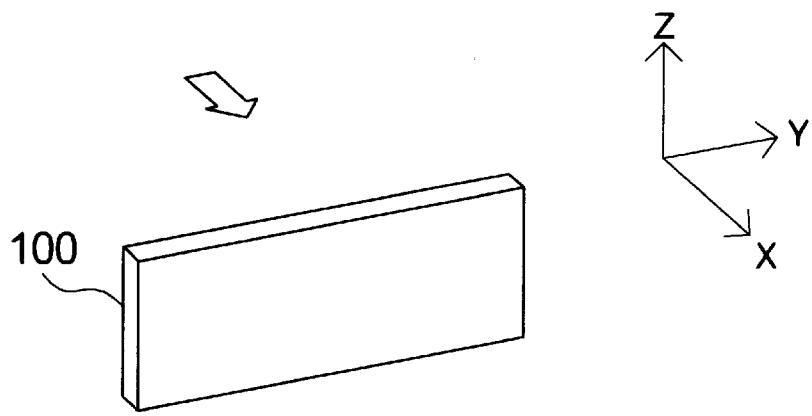
FIG. 1A shows the ideal relative position of the CCD module and the path of the light.
Figure 1B:
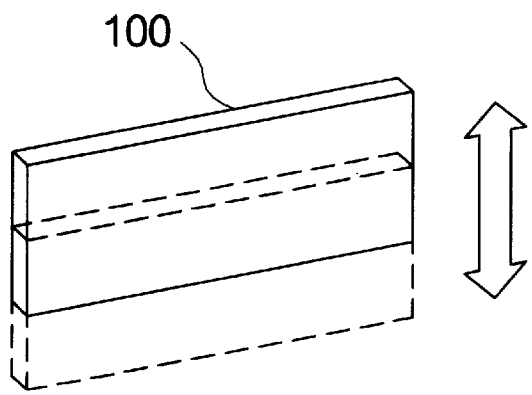
FIG. 1B to FIG. 1F show the movement of the CCD module.
Figure 1C:
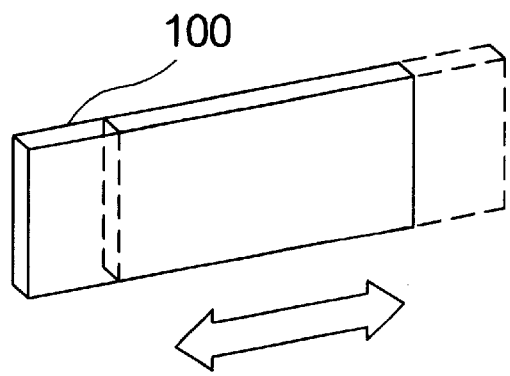
Figure 1D:
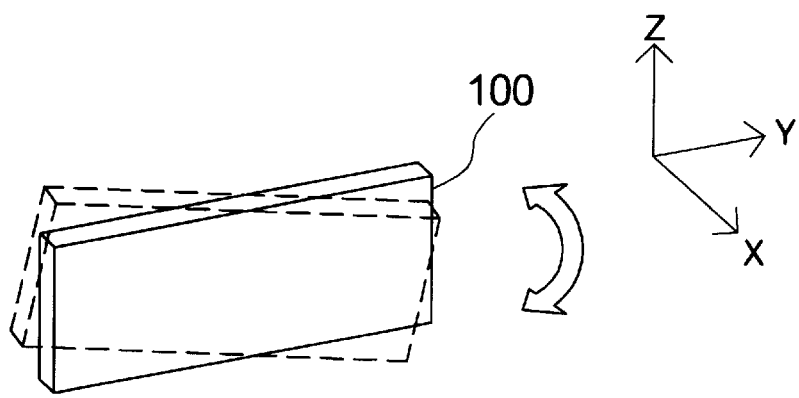
Figure 1E:
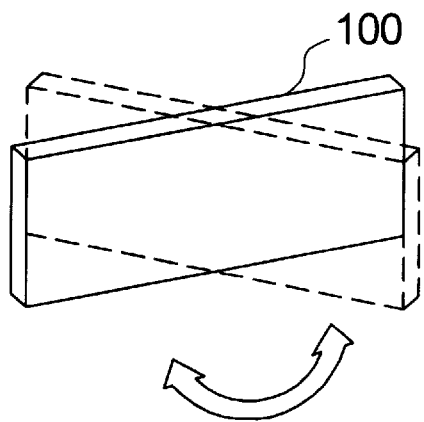
Figure 1F:
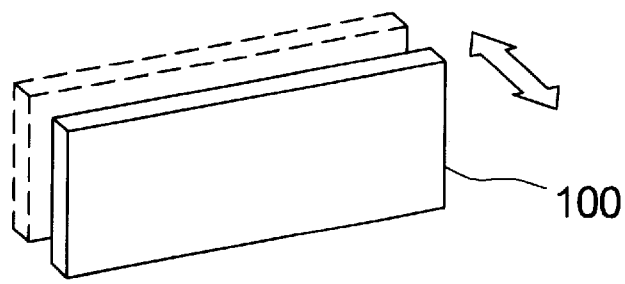
Figure 2:
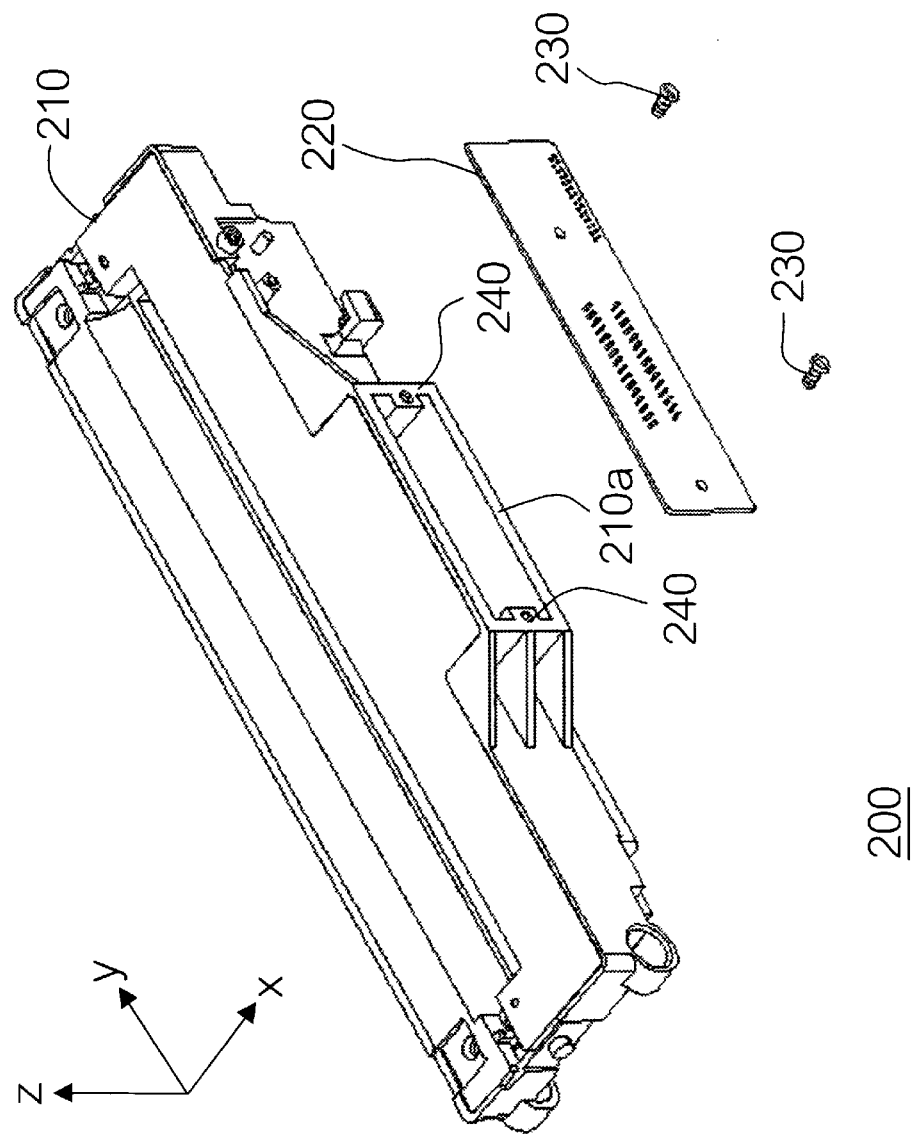
FIG. 2 shows the conventional three-direction adjustable optical module.
Figure 3:
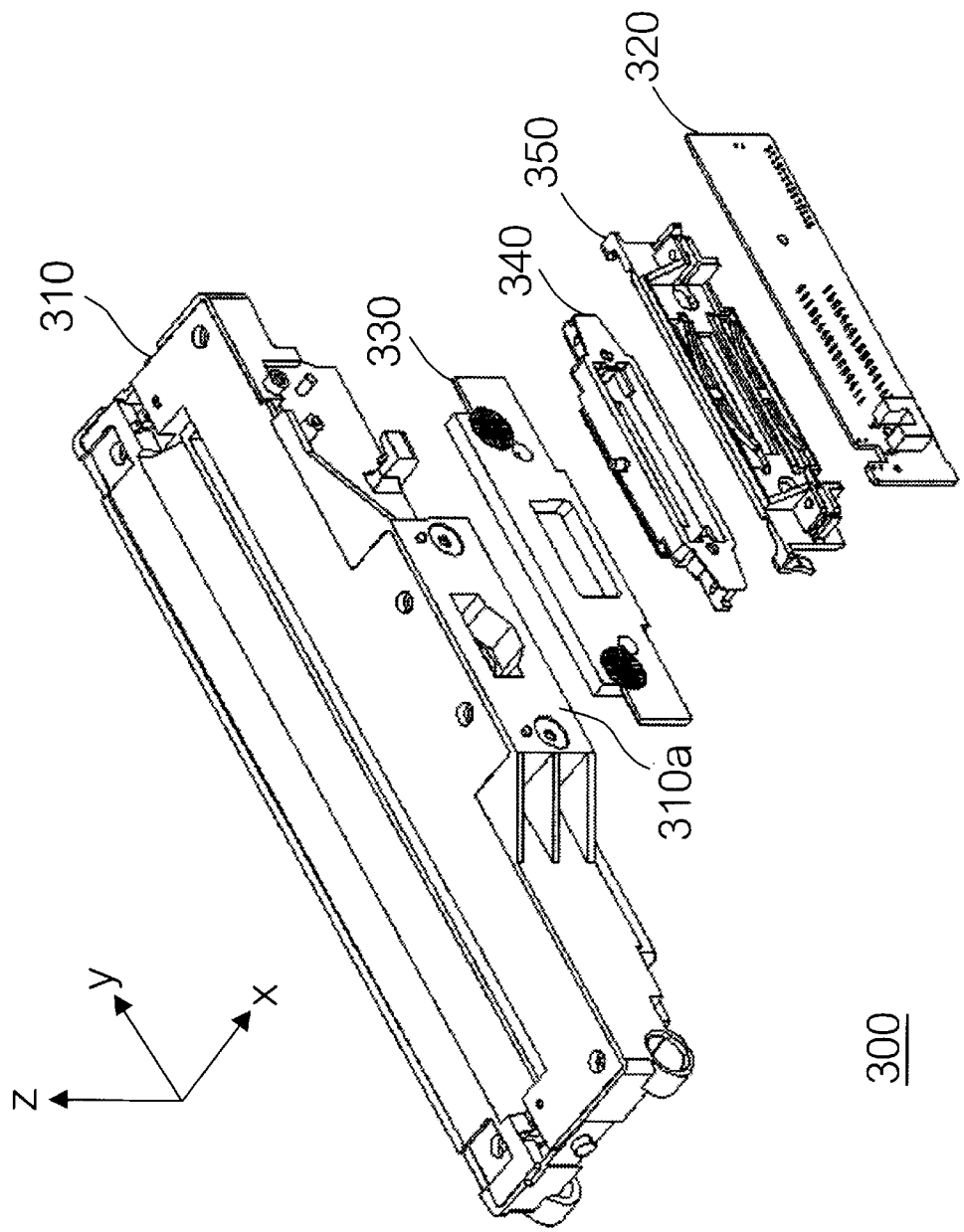
FIG. 3 shows the conventional five-direction adjustable optical module.
Figure 4:
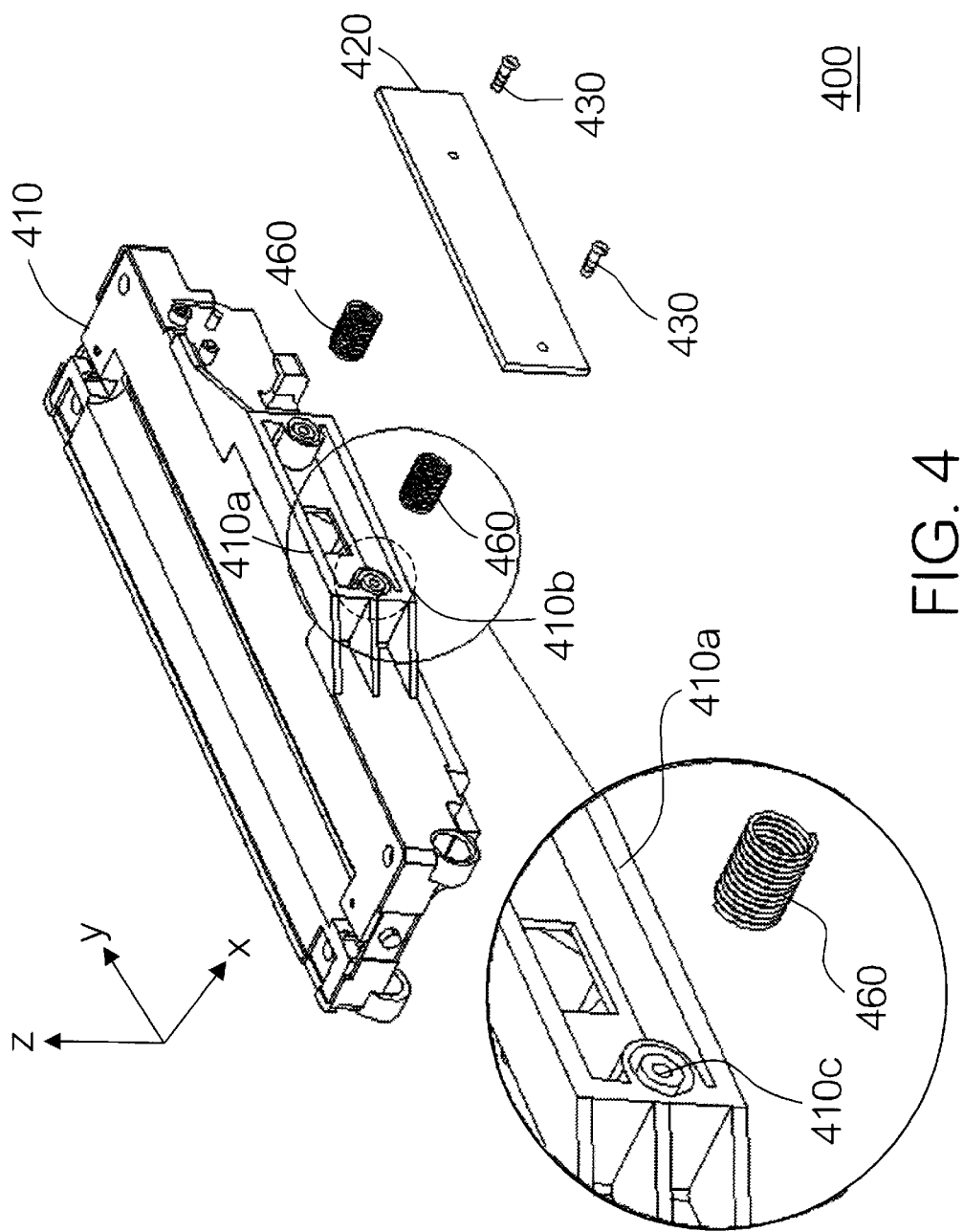
FIG. 4 shows a four-direction adjustable optical module according to the first example of the preferred embodiment of the invention.

A four-direction adjustable optical module 400 according to a preferred embodiment of the invention, as shown in FIG. 4, includes a carriage 410 and a CCD module 420. The carriage 410 has a coupling window 410a for connecting with the CCD module 420. Different from the conventional three-direction adjustable optical module, the optical module 400 of the invention has a spring base 410b at the coupling window 410a and the spring base 410b has a screw hole 410c at the center. According to the spirit of the invention, the spring inserted into the spring base 410b extends longer than the depth of the spring base 410b so that the spring 460 protrudes from the surface of the coupling window 410a. The spring 460 is mounted in the spring base 410b prior to the assembly of the CCD module 420 and the carriage 410.

While the CCD module 420 and the carriage 410 are assembled, screws 430, penetrating the CCD module 420, are screwed into the screw hole 410c and the springs 460 will deform according to the stress from the screws 430. If the screw 430 is screwed more tightly, the spring 460 will shrink and the CCD module 420 and the coupling window 410a are closer to each other. If the screw 430 is more loosely screwed, the spring 460 will extend longer and the distance between the CCD module 420 and the coupling window 410a is larger. Because the two screws 430 can be screwed separately, the two sides of the CCD module 420 can be adjusted individually. Consequently, the CCD module 420 can be adjusted to rotate in a certain range on the Z axis.

Figure 5:
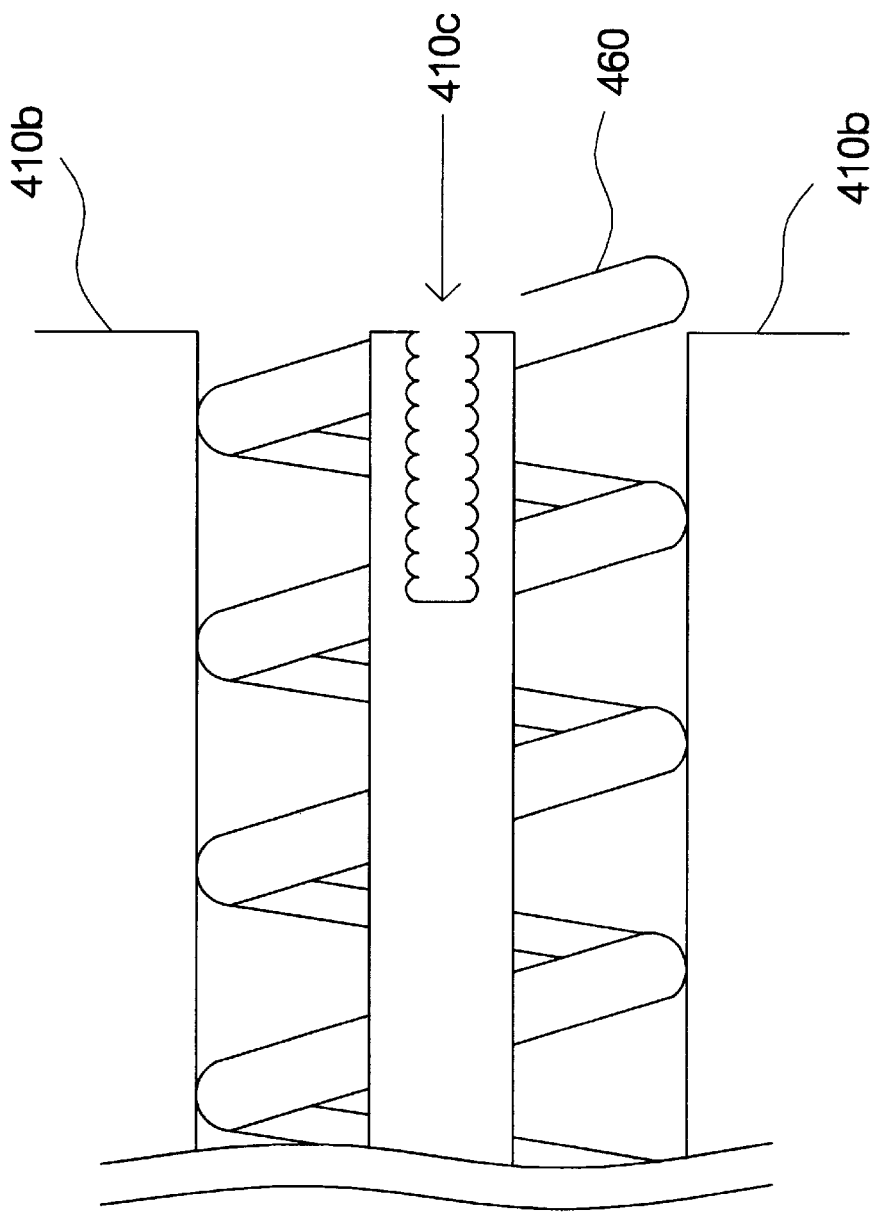
FIG. 5 shows the detail structure of the spring base and the spring inserted thereto as shown in FIG. 4.

The detail structure of the spring base 410b and the spring inserted thereto is illustrated in FIG. 5. It is clearly shown that the spring 460 protrudes from the surface of the coupling window 410a for a certain distance. The length of the spring 460 protrudes from the surface of the coupling window 410a should not be too long because the adjustment of the rotating movement on the Z axis is fine.

Accordingly, the optical module of the first example of the invention can be adjusted in at least four directions. In other words, the CCD module can move along the Y and Z axes and rotate on the X and Z axes. Further more, the focusing procedure of the optical module provides the function of adjustment along the X axis. Thus, the optical module according to the first example of the invention can be regarded as adjustable in five directions.

EXAMPLE 2

Figure 6:
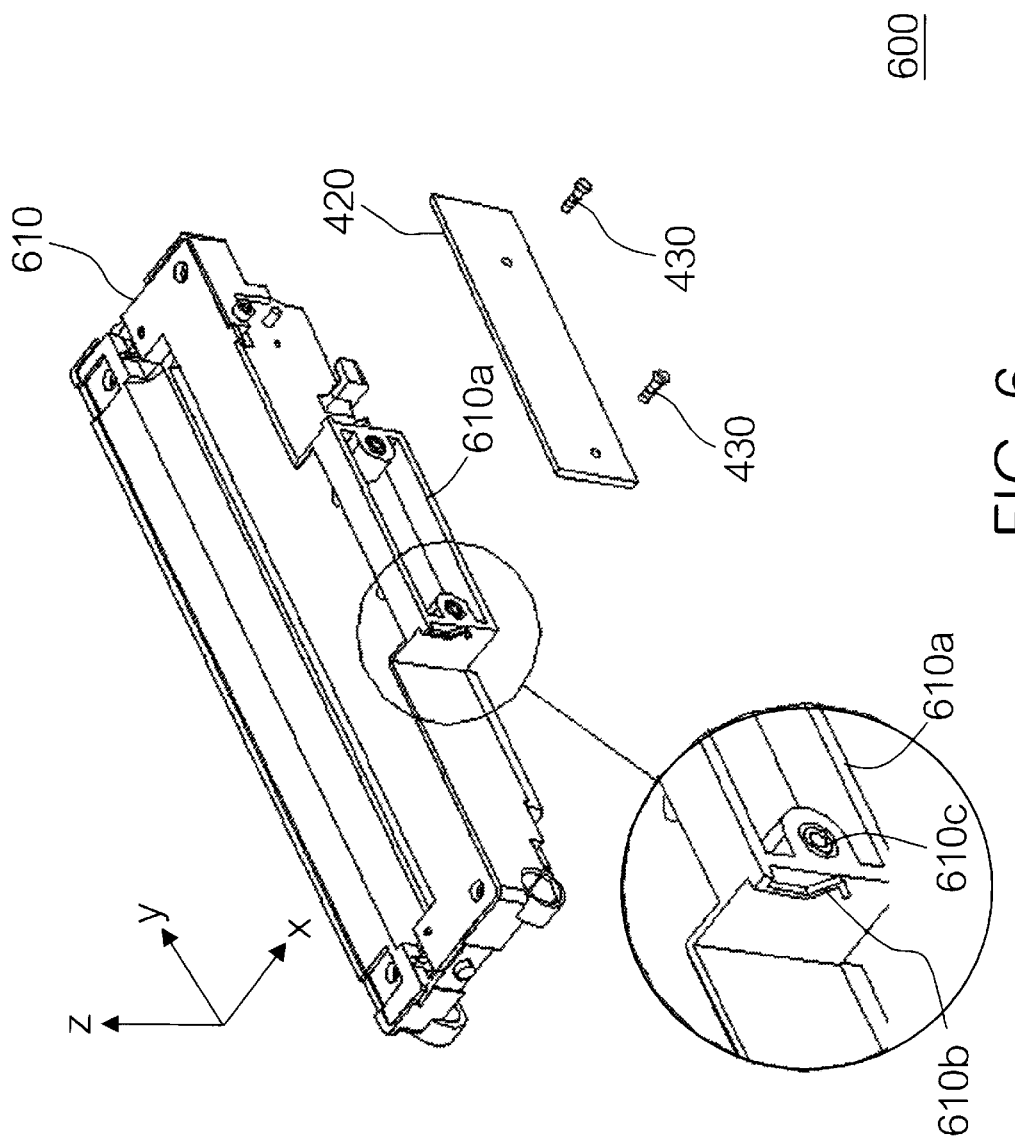
FIG. 6 shows a four-direction adjustable optical module according to the second example of the preferred embodiment of the invention.

A four-direction adjustable optical module 400 according to the second example of the preferred embodiment of the invention, as shown in FIG. 6, is similar to the conventional three-direction adjustable optical module in structure. The optical module 600 includes a carriage 610 and a CCD module 420. The carriage 610 has a coupling window 610a for connecting with the CCD module 420. Different from the conventional three-direction adjustable optical module, the optical module 600 of the invention has an elastic device 610b such as an elastic arm. The elastic device 610b can be made of plastic and formed together with the carriage 610 and the coupling window 610a. According to the spirit of the invention, the elastic device 610b protrudes from the surface of the coupling window 610a.

While the CCD module 420 and the carriage 610 are assembled, screws 430, penetrating the CCD module 420, are screwed into the screw hole 610c and the elastic device 610b will deform according to the stress from the screws 430. If the screw 430 is screwed more tightly, the elastic device 610b will move toward the carriage 610 and the CCD module 420 and the coupling window 610a are closer to each other. If the screw 430 is more loosely screwed, the CCD module 420 will be propped by the elastic device 610b and the distance between the CCD module 420 and the coupling window 610a is larger. Because the two screws 430 can be screwed separately, the two sides of the CCD module 420 can be adjusted individually. Consequently, the CCD module 420 can be adjusted to rotate in a certain range on the Z axis.

Figure 7:
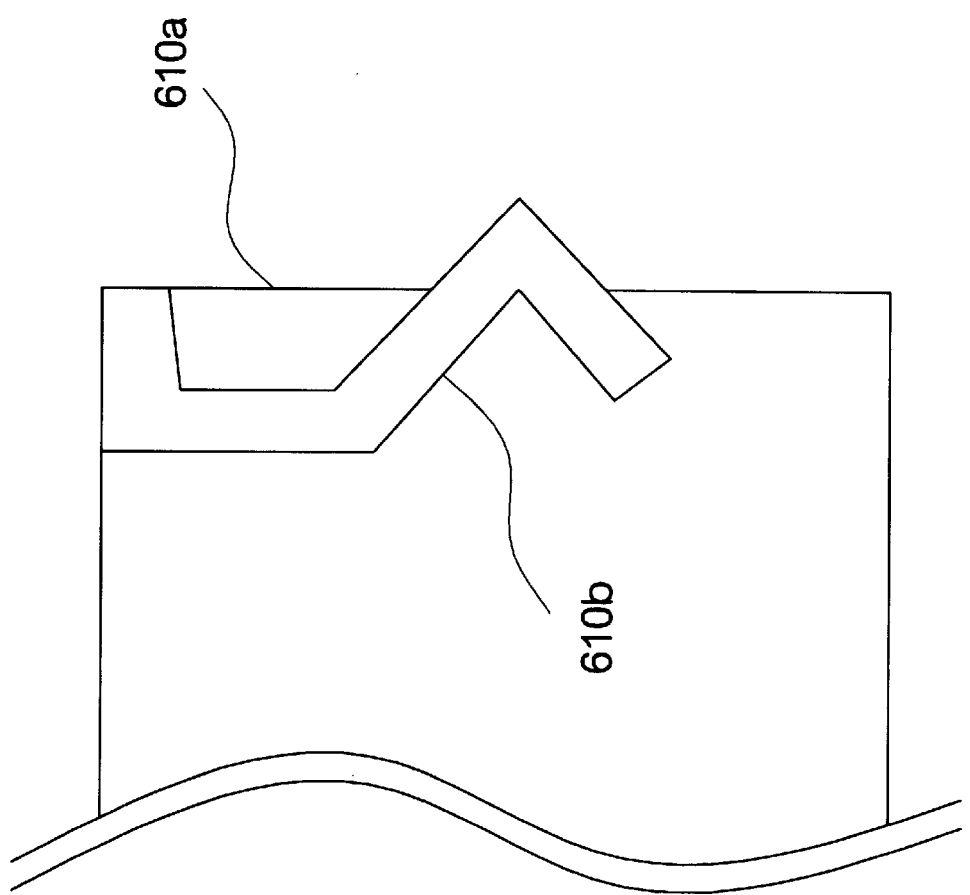
FIG. 7 shows the detailed structure of the elastic device.

The detail structure of the elastic device 610b is illustrated in FIG. 7. It is clearly shown that the elastic device 610b protrudes from the surface of the coupling window 610a for a certain distance. The length of the elastic device 610b protrudes from the surface of the coupling window 610a should not be too long because the adjustment of the rotating movement on the Z axis is fine.

Accordingly, the optical module of the second example of the invention can be adjusted in at least four directions. In other words, the CCD module can move along the Y and Z axes and rotate on the X and Z axes. Further more, the focusing procedure of the optical module provides the function of adjustment along the X axis. Thus, the optical module according to the second example of the invention can be regarded as adjustable in five directions.

The optical module of the invention has the advantage of being adjustable in five directions and also is low in cost. Therefore, the optical module according to a preferred embodiment of the invention is convenient for the user, excellent in capturing image and competitive in market.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A calibration apparatus of an optical module, the optical module comprising a carriage and a CCD module, the carriage comprising a coupling window for connecting with the CCD module, wherein the calibration apparatus is an elastic device and is installed at the coupling window, and wherein the calibration apparatus of the optical module deforms due to stress of the CCD module while the CCD module is coupled to the coupling window and consequently, the orientation of the CCD module rotating on the Z axis can be calibrated.

2. The calibration apparatus of an optical module as claimed in claim 1 wherein the elastic device is a spring.

3. The calibration apparatus of an optical module as claimed in claim 1 is an elastic arm.

4. The calibration apparatus of an optical module as claimed in claim 3, wherein the elastic arm and the coupling window are formed together.

5. A four-direction adjustable optical module, comprising:
   a CCD module;
   a carriage, wherein the carriage comprises a coupling window for coupling with the CCD module; and
   an elastic device connected to and protruding from the coupling window, wherein the elastic device deforms due to stress of the CCD module while the CCD module is coupled to the coupling window and consequently, the orientation of the CCD module rotating on the Z axis can be calibrated.

6. The four-direction adjustable optical module as claimed in claim 5, wherein the elastic device is an elastic arm.

7. The four-direction adjustable optical module as claimed in claim 6, wherein the elastic arm and the coupling window are formed together.

8. The four-direction adjustable optical module as claimed in claim 5, wherein the elastic device is a spring.

9. A four-direction adjustable optical module, comprising:

a CCD module;

a carriage, wherein the carriage comprises a coupling window for coupling with the CCD module;

a spring base at the coupling window; and a spring coupled to and protruding from the coupling window, wherein the spring deforms due to stress of the CCD module while the CCD module is coupled to the coupling window and consequently, the orientation of the CCD module rotating on the Z axis can be calibrated.

* * * * *

UNITED STATES PATENT AND TRADEMARK OFFICE
CERTIFICATE OF CORRECTION

PATENT NO. : 6,545,266 B2 Page 1 of 1
APPLICATION NO. : 09/732775
DATED : April 8, 2003
INVENTOR(S) : Lung Chen et al.

It is certified that error appears in the above-identified patent and that said Letters Patent is hereby corrected as shown below:

First page Item (75): Change inventors' names from "Chen Lung" to --Lung Chen--, and from "Lee Ta-Yi" to --Ta-Yi Lee--.

Signed and Sealed this

Fifteenth Day of January, 2008

JON W. DUDAS
*Director of the United States Patent and Trademark Office*